(12) United States Patent
Kisaka et al.

(10) Patent No.: US 7,474,485 B2
(45) Date of Patent: Jan. 6, 2009

(54) MAGNETIC DISK MEDIUM, MAGNETIC DISK DRIVE, AND METHOD FOR DETECTING ROTATIONAL POSITION OF MAGNETIC DISK MEDIUM

(75) Inventors: Masashi Kisaka, Kanagawa (JP); Masahiro Shohda, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 255 days.

(21) Appl. No.: 11/273,792

(22) Filed: Nov. 14, 2005

(65) Prior Publication Data

US 2006/0109580 A1 May 25, 2006

(30) Foreign Application Priority Data

Nov. 22, 2004 (JP) .............................. 2004-338213

(51) Int. Cl.
*G11B 5/09* (2006.01)
(52) U.S. Cl. .................... 360/48; 360/53; 360/77.02
(58) Field of Classification Search ..................... None
See application file for complete search history.

(56) References Cited

U.S. PATENT DOCUMENTS

| | | | | |
|---|---|---|---|---|
| 4,910,617 A | * | 3/1990 | Brunnett et al. | 360/78.14 |
| 5,386,402 A | * | 1/1995 | Iwata | 369/30.1 |
| 5,784,220 A | * | 7/1998 | Nishimura et al. | 360/78.14 |
| 5,812,755 A | * | 9/1998 | Kool et al. | 714/8 |
| 6,038,097 A | * | 3/2000 | Le et al. | 360/78.14 |
| 6,049,438 A | * | 4/2000 | Serrano et al. | 360/49 |
| 6,075,667 A | * | 6/2000 | Kisaka et al. | 360/49 |
| 6,104,558 A | * | 8/2000 | Greenberg et al. | 360/49 |
| 6,105,104 A | * | 8/2000 | Guttmann et al. | 711/4 |
| 6,233,106 B1 | * | 5/2001 | Chambers | 360/48 |
| 6,237,105 B1 | * | 5/2001 | Walsh et al. | 713/500 |
| 6,327,105 B1 | * | 12/2001 | DeForest | 360/49 |
| 6,957,360 B2 | * | 10/2005 | Sims et al. | 714/8 |
| 7,116,505 B1 | * | 10/2006 | Kupferman | 360/48 |
| 7,242,546 B2 | * | 7/2007 | Ooi et al. | 360/48 |
| 2001/0024335 A1 | * | 9/2001 | Blaum et al. | 360/48 |
| 2003/0161067 A1 | * | 8/2003 | Ramler et al. | 360/77.05 |

* cited by examiner

*Primary Examiner*—Hoa T Nguyen
*Assistant Examiner*—Dismery Mercedes
(74) *Attorney, Agent, or Firm*—Townsend and Townsend and Crew LLP; Patrick Duncan

(57) ABSTRACT

Embodiments of the invention reduce the information (storage) overhead for determining the rotational position of a magnetic disk medium, as well as reducing the rotational position detection time. In one embodiment, a sector servo magnetic disk medium is configured such that: each track is divided into blocks each including a series of sectors; each block stores a positional information bit string as rotational position information; the positional information bit string is made up of a position code and an identification code, the position code including a block number, the identification code being used to identify the start or the end of the position code; and each bit of the positional information bit string is stored in a different sector of the block. When each block is made up of 12 sectors, for instance, if the block number is denoted as $b_0 b_1 b_2 b_3 b_4 b_5$, the positional information bit string may be expressed as $00001 b_0 b_1 b_2 1 b_3 b_4 b_5$, where the first 5 bits "00001" constitute an identification code.

12 Claims, 3 Drawing Sheets

MAGNETIC DISK MEDIUM, MAGNETIC DISK DRIVE, AND METHOD FOR DETECTING ROTATIONAL POSITION OF MAGNETIC DISK MEDIUM

CROSS-REFERENCES TO RELATED APPLICATIONS

This application claims priority from Japanese Patent Application No. JP2004-338213, filed Nov. 22, 2004, the entire disclosure of which is incorporated herein by reference.

BACKGROUND OF THE INVENTION

The present invention relates to a magnetic disk medium, a magnetic disk drive, and a method for detecting the rotational position of a magnetic disk medium, and more particularly to a technique of accurately determining the rotational position of a magnetic disk medium with a low overhead.

Magnetic disk drives write servo data to their magnetic disk media so as to be able to servo-control their heads. One technique for writing servo data is the sector servo system in which servo data is written to each sector, or data region, which is a subdivision of a track on a magnetic disk medium. Each piece of servo data includes a track number and a sector number.

Conventionally, the rotational position of a magnetic disk medium is determined based on a sector number read by the head.

BRIEF SUMMARY OF THE INVENTION

The number of sectors included in each track increases with increasing recording density of the magnetic disk medium, resulting in an increase in the number of bits required for representing each sector number. Therefore, if the sector number is included in the servo data of each sector, the area to which user data is written must be reduced, thus causing the problem of increased overhead.

To address the above problem of increased overhead, one method for detecting the rotational position of a magnetic disk medium stores an index bit in a selected sector in each track and counts sectors from the position of the index bit. However, to detect the index bit of the target track under the head, this method generally requires the length of time equivalent to one rotation of the magnetic disk medium at the maximum. Furthermore, if the magnetic disk drive has failed to properly detect the index bit due to external noise or a defect in the magnetic disk medium, it must wait for another rotation, further consuming time. Thus, this method takes a long time to determine the rotational position of the disk and access a desired sector.

To address the above problem, U.S. Pat. No. 6,327,105 discloses a technique in which a plurality of codes are associated with different locations on each track. The codes are formed such that they can be identified even when some of their bits are erroneous. The bits of each code are written to a series of sectors, one bit for each sector, from the associated location. With this technique, however, only special codes can be used, limiting the number of usable codes which can be discriminated from each other. This means that the number of rotational positions on each track which can be identified by use of these codes is also limited, relatively increasing the distance between these rotational positions. Therefore, this technique has a problem in that it takes a relatively long time to detect the disk rotational position at the target track under the head, even though the overhead can be reduced.

The present invention has been devised to solve the above problems. It is, therefore, a feature of the present invention to provide a magnetic disk medium, a magnetic disk drive, and a method for detecting the rotational position of a magnetic disk medium, capable of reducing the storage overhead necessary to detect the rotational position of the magnetic disk medium, as well as reducing the time it takes to detect the rotational position.

One aspect of the present invention provides a sector servo magnetic disk medium having tracks formed thereon, each track being divided into a plurality of sectors to which servo data is written, wherein each track is also divided into a plurality of blocks each including one or more of the plurality of sectors, the one or more sectors being sequentially arranged along each track, wherein each block stores a positional information bit string which includes address information corresponding to a position of each block on the track, wherein the positional information bit string is made up of a position code and an identification code, the position code including the address information, the identification code being used to identify the start or the end of the position code, and wherein the positional information bit string is divided into a plurality of portions each stored in a different sector of the block, each portion forming a predetermined part of servo data stored in the different sector.

Another aspect of the present invention provides a sector servo magnetic disk drive comprising: a magnetic disk medium having tracks formed thereon, each track being divided into a plurality of sectors to which servo data is written; and a control circuit for detecting a rotational position of the magnetic disk medium based on the servo data; wherein each track is also divided into a plurality of blocks each including one or more of the plurality of sectors, the one or more sectors being sequentially arranged along each track; wherein each block stores a positional information bit string which includes address information corresponding to a position of each block on the track; wherein the positional information bit string is made up of a position code and an identification code, the position code including the address information, the identification code being used to identify the start or the end of the position code; wherein the positional information bit string is divided into a plurality of portions each stored in a different sector of the block, each portion forming a predetermined part of servo data stored in the different sector; and wherein the control circuit detects the rotational position based on the positional information bit string read from each block.

Still another aspect of the present invention provides a method for detecting the rotational position of the above sector servo magnetic disk medium, the method comprising the steps of: as the magnetic disk medium rotates, sequentially reading the value of each bit of the predetermined portion of the servo data (in each sector) and generating a cyclic positional information bit string, the predetermined portion of the servo data constituting the positional information bit string; detecting the identification code from the cyclic positional information bit string; detecting the position code from the cyclic positional information bit string based on a position of the identification code; extracting the address information from the position code; and detecting the rotational position based on the address information (at the read timing of the position code).

According to the present invention, it is possible to reduce the storage overhead necessary to determine the (disk) rotational position, as well as reducing the time it takes to detect the rotational position.

DETAILED DESCRIPTION OF THE INVENTION

An exemplary embodiment of the present invention will be described below with reference to the accompanying drawings.

Figure 1:
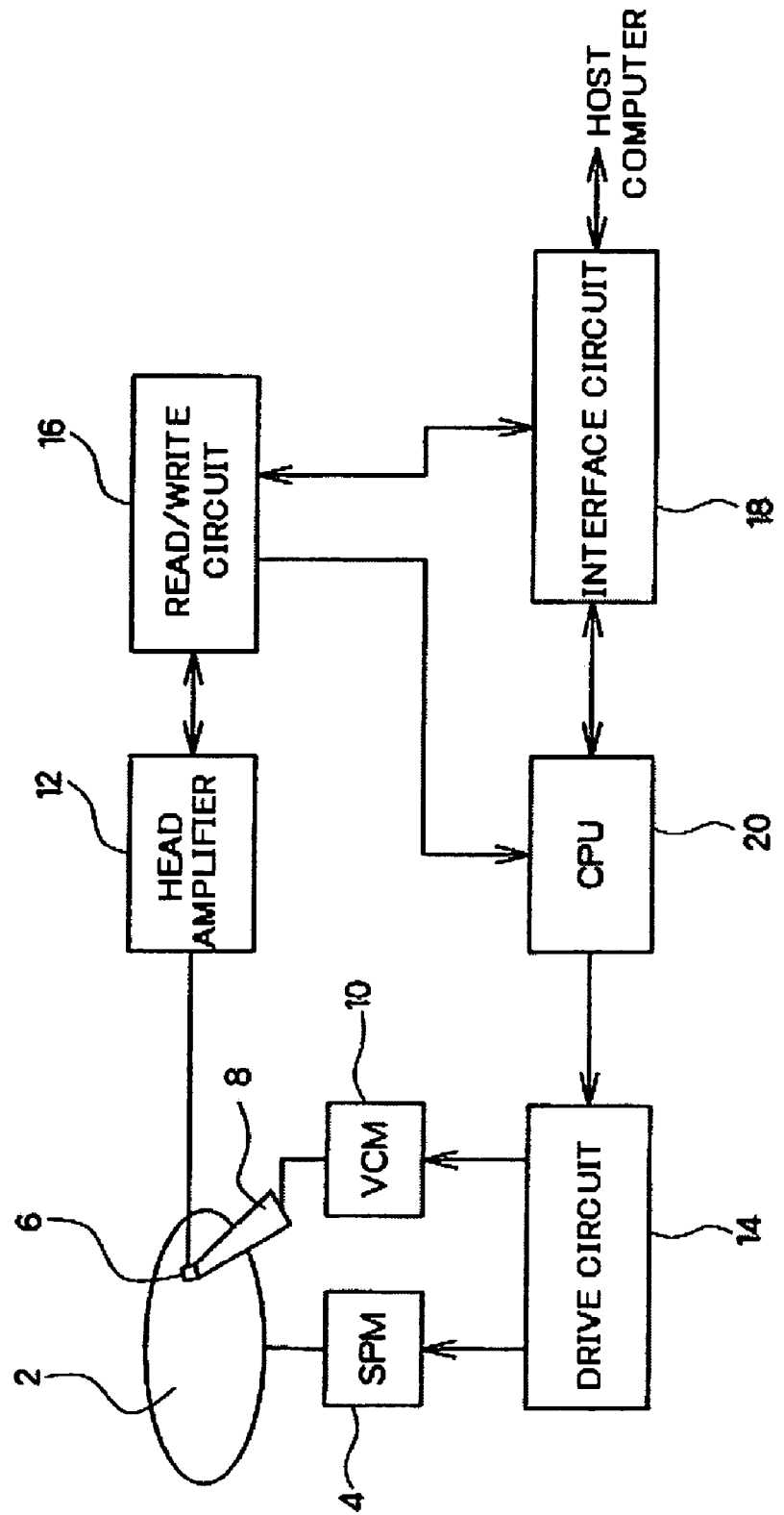
FIG. 1 is a schematic block diagram showing the configuration of a magnetic disk drive according to an embodiment of the present invention.

FIG. 1 is a schematic block diagram showing the configuration of a magnetic disk drive according to an embodiment of the present invention. The magnetic disk drive comprises a magnetic disk medium (or a disk) 2, a spindle motor (SPM) 4, a head element (or a head) 6, a head arm 8, a voice coil motor (VCM) 10, a head amplifier 12, a drive circuit 14, a read/write circuit 16, an interface circuit 18, and a CPU 20.

The magnetic disk drive writes information along a plurality of concentric tracks formed on the surface of the disk 2 using a magnetic field. Each track is divided into a plurality of sectors each having servo data written thereto beforehand.

The disk 2 is rotated by the SPM 4 at high speed. The head 6 is mounted on the tip of the head arm 8. The direction of the head arm 8 is changed by the VCM 10 so as to move the head 6 from one track to another, thus achieving a seek operation. In a data write or data read operation, the head 6 is positioned close to the surface of the rotating disk 2. In a write operation, the head 6 forms a magnetization pattern on the surface of the disk 2 which varies along the track. In a read operation, on the other hand, the head 6 senses changes in the magnetic field generated according to the magnetization pattern formed on the surface of the disk 2. The SPM 4 and the VCM 10 are driven by the drive circuit 14 under the control of the CPU 20.

The head 6 is connected to the read/write circuit 16 through the head amplifier 12. The head amplifier 12 amplifies the electrical signal input to or output received from the head 6. From the electrical signal received from the head 6, the read/write circuit 16 detects servo data written to the disk 2, and obtains positional information on the head 6 from the servo data. The read/write circuit 16 obtains the track number and the sector number constituting the positional information on the head 6 and outputs them to the CPU 20. Furthermore, the read/write circuit 16 transmits/receives user data to/from the host computer to which the magnetic disk drive is connected.

In a data write operation, the interface circuit 18 receives a write address and user data from the host computer. The interface circuit 18 outputs the write address to the CPU 20 and buffers the user data. The CPU 20 issues a control instruction to the drive circuit 14 based on the write address, so that, for example, the drive circuit 14 drives the VCM 10 to move the head 6 to the track corresponding to the write address. Further, the CPU 20 calculates the timing at which the sector corresponding to the write address will reach the position of the head 6 based on the positional information on the head 6 supplied from the read/write circuit 16. At a timing matching the calculated timing, the read/write circuit 16 reads the user data (which is to be written to the write address) from the buffer memory of the interface circuit 18. The read/write circuit 16 modulates the user data and then writes it to the disk 2 through the head 6.

In a data read operation, on the other hand, the interface circuit 18 receives a read address from the host computer. The interface circuit 18 then outputs the read address to the CPU 20. The CPU 20 issues a control instruction to the drive circuit 14 based on the read address, so that, for example, the drive circuit 14 drives the VCM 10 to move the head 6 to the track corresponding to the read address. The read/write circuit 16 obtains positional information on the head 6 from the servo data stored in each sector passing under the head 6 and outputs it to the CPU 20. Furthermore, the read/write circuit 16 demodulates the user data stored in the sectors and outputs it to the interface circuit 18. The interface circuit 18 buffers the user data. Based on the positional information on the head 6 supplied from the read/write circuit 16, the CPU 20 determines the timing at which the sector corresponding to the read address was read. The interface circuit 18 outputs the user data read at the determined timing to the host computer from its buffer memory.

Figure 2:
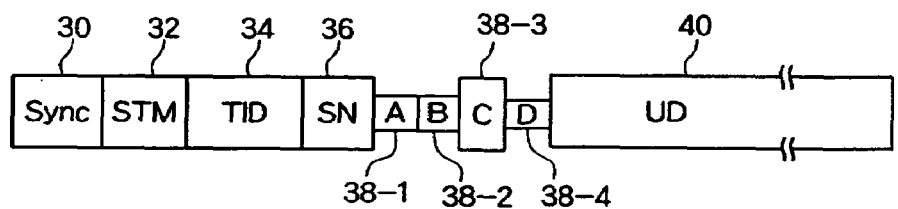
FIG. 2 is a schematic diagram showing the data structure of each sector.

A description will be given below of how the read/write circuit 16 detects positional information on the head 6. FIG. 2 is a schematic diagram showing the data structure of each sector. Specifically, the figure shows various types of regions in a sector. They are arranged from left to right; the leftmost region is the head portion of the sector while the rightmost region the tail portion. That is, referring to the figure, the head 6 scans the sectors from left to right as the disk 2 rotates. The servo data portion is on the left and is followed by the user data portion. The servo data portion comprises a Sync field 30, an STM field 32, a TID field 34, an SN field 36, and a burst signal field 38. A UD field 40, which is sandwiched by this sector and the subsequent sector constitutes the user data portion.

The Sync field 30 is a region for storing a signal for establishing synchronization with the clock and adjusting the gain of the head amplifier 12 so as to maintain constant servo data amplitude. The STM field 32 stores a unique code common to all sectors, indicating the beginning of the servo information.

The TID field 34 stores a track number. The track at which the head 6 is currently located can be determined by reading the TIED field 34 of the servo data. The SN field 36, on the other hand, is a region for storing information indicating the rotational position of the disk 2.

Burst signal fields 38-1 to 38-4 store burst signals A to D, respectively, which give information about the position of the head 6 relative to the track. The burst signals A to D are used to control the position of the head 6 such that it is aligned with the track with high precision.

Conventionally, the SN field stores a sector number for sequentially numbering each sector arranged along the track, and therefore the SN field has a bit length corresponding to the number of sectors in the track. In the magnetic disk drive of the present embodiment, however, each SN field 36 of the disk 2 has only one bit. A description will be given below of a method for detecting the rotational position of the disk 2 using the SN field 36.

Figure 3:
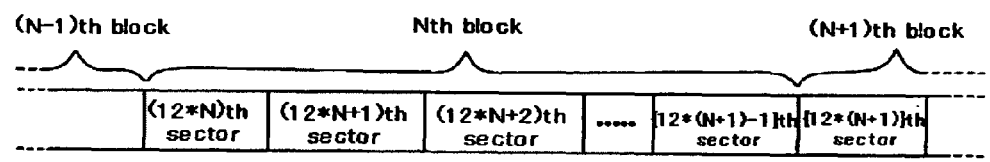
FIG. 3 is a schematic diagram showing the structure of a block.

According to this method, each track is divided into blocks each including a series of k number of sectors. For example, the $N^{th}$ block includes the $(k*N)^{th}$ sector to the $\{k*(N+1)-1\}^{th}$ sector. FIG. 3 is a schematic diagram showing the structure of a block. Specifically, the figure shows primarily the $N_{th}$ block that includes 12 sectors arranged along a track (k=12).

Figure 4:
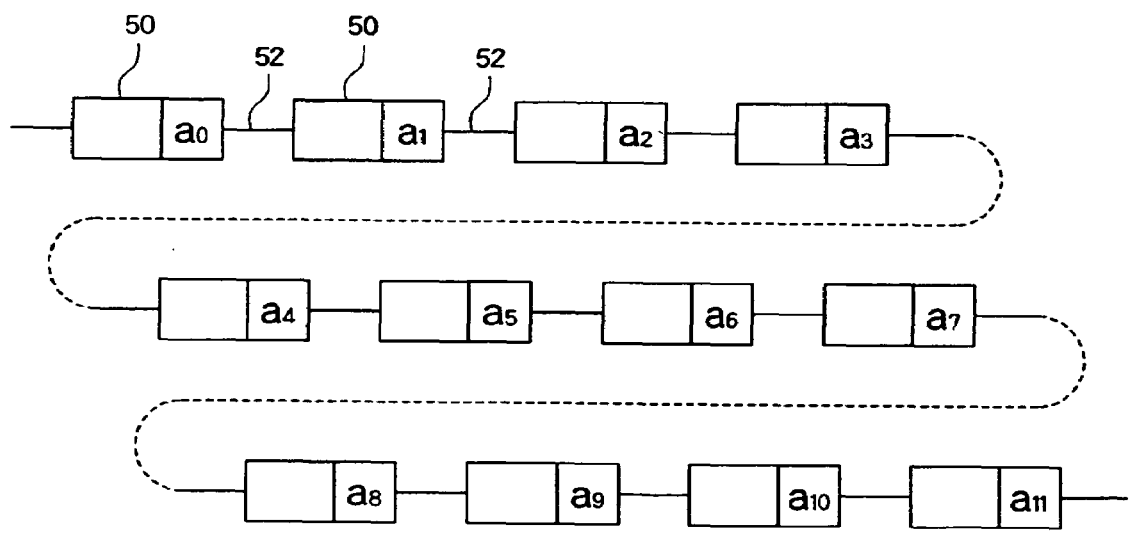
FIG. 4 is a schematic diagram showing a block, in which the structure of each sector is depicted in simplified form.

The SN fields of the 12 sectors in a block each store a 1-bit value (referred to as an SN value) which constitutes a 12-bit string representing positional information. This positional information bit string includes a block number, which is address information for indicating the position of each block on a track. This address information can be used to detect the rotational position of the disk 2. FIG. 4 is a schematic block diagram showing a block, in which the structure of each sector is depicted in simplified form. In the figure, each box 50 represents a servo data portion excluding the burst signal field 38, while each line 52 connecting between boxes 50 represents the rest of the sector. Further, symbol $a_i$ denotes the SN value of the $i^{th}$ sector in the block.

The above positional information bit string denoted as $a_0a_1a_2a_3a_4a_5a_6a_7a_8a_9a_{10}a_{11}$ in the figure includes an identification code and a position code. The first portion of the positional information bit string constitutes the identification code, which is a bit string having a predetermined bit pattern, while the other portion forms the position code, which is also a bit string. The position code represents a block number (corresponding to address information). The identification code, on the other hand, is used to identify the start position of the position code and has a predetermined unique bit pattern which does not appear in any position codes.

For example, the identification code may be a fixed (M+1) bit pattern whose first M bits are 0 and the last bit is 1 (delimiter bit), and the remaining (11−M) bits of the positional information bit string may be used as the position code. In this case, each position code is formed such that it does not include any "0" bit strings longer than (M−1) bits, that is, each "1" bit is separated from the subsequent "1" bit by less than M "0" bits. To achieve this, some bits of the position code are fixed at 1. They are called delimiter bits. Such a delimiter bit arrangement prevents the bit pattern of the identification code from appearing in the position code, allowing the start position of the position code to be identified by use of the identification code. The bits of a position code excluding the predetermined delimiter bits constitute a block number.

According to a first working example of the embodiment, M=4, that is, the identification code has the bit pattern "00001". This is expressed as: $a_1a_2a_3a_4$=00001. In this case, the remaining 7 bits $a_5$, $a_6$, $a_7$, $a_8$, $a_9$, $a_{10}$, and $a_{11}$ constitute the position code. In this code, the bit $a_8$ is fixed at 1 as a delimiter bit (thereby dividing the position code) and the rest of the bits (that is, $a_5$, $a_6$, $a_7$, $a_9$, $a_{10}$, and $a_{11}$) are used to form a block number. That is, if the block number is a 6 bit string denoted as $b_0b_1b_2b_3b_4b_5$, the two 3-bit strings $a_5a_6a_7$ and $a_9a_{10}a_{11}$ correspond to the two 3-bit strings $b_0b_1b_2$ and $b_3b_4b_5$, respectively. Therefore, the positional information bit string may be expressed as $00001b_0b_1b_21b_3b_4b_5$.

According to a second working example of the embodiment, M=3, that is, the identification code has the bit pattern "0001". This is expressed as: $a_0a_1a_2a_3$=0001. In this case, the remaining 8 bits $a_4$, $a_5$, $a_6$, $a_7$, $a_8$, $a_9$, $a_{10}$, and $a_{11}$ constitute the position code. In this code, the bits $a_6$ and $a_9$ are set at 1 as delimiter bits (thereby dividing the position code) and the rest of the bits (that is, $a_4$, $a_5$, $a_7$, $a_8$, $a_{10}$, and $a_{11}$) are used to form a block number. That is, if the block number is a 6 bit string denoted as $b_0b_1b_2b_3b_4b_5$, the three 2-bit strings $a_4a_5$, $a_7a_8$, and $a_{10}a_{11}$ correspond to the three 2-bit strings $b_0b_1$, $b_2b_3$, and $b_4b_5$, respectively. Therefore, the positional information bit string may be expressed as $0001b_0b_11b_2b_31b_4b_5$.

In the above two examples, since each block is expressed as a 6-bit binary number, a maximum of 64 blocks (i.e., 768 sectors) can be formed on a single track. It should be noted that in the above configuration in which each block is made up of 12 sectors, if the value M is set to 3 or 4, the address bit string $\{b_i\}$ (constituting the block number) in the positional information bit string has the maximum length. That is, the number of blocks which can be formed on each track can be maximized by setting the value M to 3 or 4. However, if the number of blocks that must be formed on each track is 32 or less (corresponding to 384 sectors or less), the bit length of the block number can be reduced to 5. In this case, the remaining address bit may be used as a parity bit to check each read block number.

Figure 5:
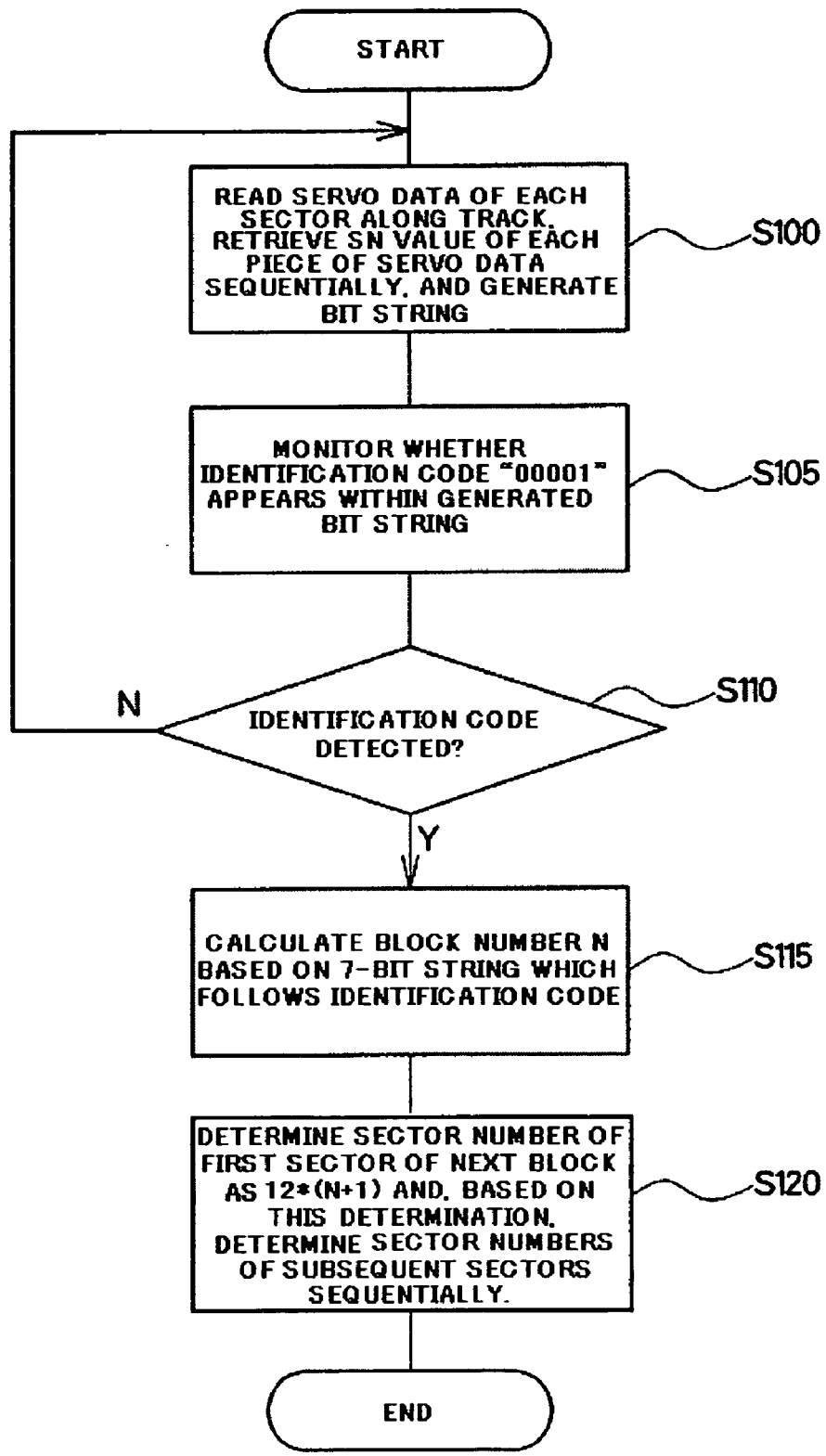
FIG. 5 is a schematic flowchart of rotational position detection processing performed by the read/write circuit.

In the magnetic disk drive of the present embodiment, the disk 2 has the above-described configuration and the read/write circuit 16 has a control circuit function to detect the rotational position of the disk 2, as described above. FIG. 5 is a schematic flowchart of the rotational position detection processing performed by the read/write circuit 16 when the above first working example using the identification code "00001" is employed.

At step S100, the read/write circuit 16 receives a signal read from the disk 2 by the head 6 and reads servo data from the signal. The read/write circuit 16 retrieves the 1-bit SN value in the SN field 36 of the servo data of each sector sequentially and generates a bit string made up of these SN values. This bit string differs from the above positional information bit string of each block, since it is formed by simply concatenating one bit to another without being aware of blocks. This bit string generated by the read/write circuit 16 may include a plurality of positional information bit strings concatenated to one another, and hence is referred to as a cyclic positional information bit string.

In the rotational position detection processing, each time an SN value is newly retrieved and appended to the cyclic positional information bit string, a predetermined number of most recently obtained bit values (naturally including the newly retrieved SN value) are extracted from the cyclic positional information bit string and processed as a string. Specifically, the read/write circuit 16 holds a predetermined number (e.g., 12) of most recently obtained bit values (SN values) using a sift register as a sliding window each time an SN value is newly obtained and added to the cyclic positional information bit string.

At step S105, the read/write circuit 16 monitors whether the identification code "00001" appears within the cyclic positional information bit string. An exemplary method of performing this monitoring is as follows. The values (SN values) of the first 5 bits of the shift register are retrieved in parallel and checked to see whether each SN value coincides with the value of the corresponding bit of the identification code using a logic circuit formed of inverters, AND circuits, etc.

If the identification code has been found at step S110, the read/write circuit 16 determines the 7-bit string following the found identification code as a position code (denoted as $a_5a_6a_7a_8a_9a_{10}a_{11}$) and extracts a block number N from this position code as address information. Specifically, at step S115, the block number N is calculated based on the position code using the following equation: $N=a_5*2^5+a_6*2^4+a_7*2^3+a_9*2^2+a_{10}*2^2+a_{11}$.

Once the block number N of the block currently passing under the head 6 is thus obtained, the sector number of the first sector of the next block can be automatically determined as 12*(N+1) and then the sector numbers of the subsequent sectors can be determined accordingly at step S120. Thus, the read/write circuit 16 determines these sector numbers as information about the rotational position of the disk 2 and outputs them to the CPU 20.

It should be noted that in addition to the above bit string "00001", examples of identification codes include "11110" (obtained by inverting each bit of the above bit string), "10000" (obtained by setting the first bit to 1 and the remaining 4 bits to 0), and "100001" (obtained by setting the first and last bits to 1 and the remaining 4 bits to 0).

In the above configuration, each bit of a positional information bit string is stored in a different sector. This can reduce the storage overhead necessary to determine the disk rotational position, as compared to conventional configurations in which each sector stores its sector number.

Further, each track is divided into a relatively large number of blocks (for example, 64 blocks) and the rotational position of the disk 2 is detected each time the disk 2 rotates by an angle equivalent to one block, which reduces the time it takes to determine the rotational position. That is, the time required to determine the rotational position decreases with increasing number of blocks formed on each track. Therefore, the number of blocks to be formed on each track may be determined based on the maximum number of blocks that can be represented by using the bits of the address bit string $\{b_i\}$ included in the positional information bit string, which is effective in reducing the rotational position detection time. Specifically, the number of blocks may be set based on the largest block number which can be expressed by the address bit string.

It should be noted that some overhead reduction effect can be obtained if the bit length of the portion of the positional information bit string stored in each sector is smaller than the bit length required to represent each sector number. Therefore, the positional information bit string may be divided into 2-bit strings and each 2-bit string may be stored in a different sector.

Further, the position code may represent address information other than the block number. For example, each position code may be formed such that it indicates the sector number of the first sector or the last sector of a block as address information. In such a case, however, since the sector number has a larger bit length than the block number, the length of the positional information bit string must be adjusted accordingly.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk medium having tracks formed thereon, each track being divided into a plurality of sectors to which servo data is written,
    wherein each track is also divided into a plurality of blocks each including one or more of said plurality of sectors, said one or more sectors being sequentially arranged along said each track;
    wherein each block stores a positional information bit string which includes address information corresponding to a position of said each block on the track;
    wherein said positional information bit string is made up of a position code and an identification code, said position code including said address information, said identification code being used to identify the start or the end of said position code;
    wherein said positional information bit string is divided into a plurality of portions each stored in a different sector of the block, said each portion forming a predetermined part of servo data stored in said different sector;
    wherein said identification code includes a string of M bits each having a first bit value and further includes a bit having a second bit value which immediately precedes or succeeds said string (where M denotes an integer equal to or larger than 2);
    wherein said position code includes a plurality of strings each having a length less than M bits and further includes bits each having said second bit value, said plurality of strings being separated from one another by one of said bits having said second bit value, said plurality of strings collectively forming an address bit string corresponding to said address information;
    wherein said address bit string is a binary block number for sequentially numbering each block on a track; and
    wherein when the proportion of said address bit string in said positional information bit string stored in each block is maximized, the number of blocks on each track is set based on the largest block number that can be expressed by said address bit string.

2. The magnetic disk medium as claimed in claim 1, wherein said portions of said positional information bit string each consist of one bit.

3. The magnetic disk medium as claimed in claim 1, wherein:
    said portions of said positional information bit string each consist of one bit;
    each block includes 12 sectors; and
    said value M is 3 or 4.

4. The magnetic disk medium as claimed in claim 3, wherein:
    said identification code includes a string of M bits each having a value of 0 and further includes a bit having a value of 1 which immediately follows said string;
    said position code immediately follows said identification code; and
    said position code includes strings each having a length of (M−1) bits and further includes bits each having a value of 1, said strings being separated from one another by one of said bits having a value of 1, said strings collectively forming said address bit string.

5. A magnetic disk drive comprising:
    a magnetic disk medium having tracks formed thereon, each track being divided into a plurality of sectors to which servo data is written; and
    a control circuit to detect a rotational position of said magnetic disk medium based on said servo data;
    wherein each track is also divided into a plurality of blocks each including one or more of said plurality of sectors, said one or more sectors being sequentially arranged along said each track;
    wherein each block stores a positional information bit string which includes address information corresponding to a position of said each block on the track;
    wherein said positional information bit string is made up of a position code and an identification code, said position code including said address information, said identification code being used to identify the start or the end of said position code;
    wherein said positional information bit string is divided into a plurality of portions each stored in a different sector of the block, said each portion forming a predetermined part of servo data stored in said different sector;

wherein said control circuit detects said rotational position based on said positional information bit string read from each block;

wherein said identification code includes a string of M bits each having a first bit value and further includes a bit having a second bit value which immediately precedes or succeeds said string (where M denotes an integer equal to or larger than 2);

wherein said position code includes a plurality of strings each having a length less than M bits and further includes bits each having said second bit value, said plurality of strings being separated from one another by one of said bits having said second bit value, said plurality of strings collectively forming an address bit string corresponding to said address information wherein said address bit string is a binary block number for sequentially numbering each block on a track; and wherein when the proportion of said address bit string in said positional information bit string stored in each block is maximized, the number of blocks on each track is set based on the largest block number that can be expressed by said address bit string.

6. The magnetic disk drive as claimed in claim 5, wherein:
said portions of said positional information bit string each consist of one bit;
each block includes 12 sectors; and
said value M is 3 or 4.

7. The magnetic disk drive as claimed in claim 6, wherein:
said identification code includes a string of M bits each having a value of 0 and further includes a bit having a value of 1 which immediately follows said string; and
said position code immediately follows said identification code; and
said position code includes strings each having a length of (M−1) bits and further includes bits each having a value of 1, said strings being separated from one another by one of said bits having a value of 1, said strings collectively forming said address bit string.

8. The magnetic disk drive as claimed in claim 5, wherein said portions of said positional information bit string each consist of one bit.

9. A method for detecting a rotational position of a magnetic disk medium having tracks formed thereon, each track being divided into a plurality of sectors to which servo data is written,
wherein each track is also divided into a plurality of blocks each including one or more of said plurality of sectors, said one or more sectors being sequentially arranged along said each track,
wherein each block stores a positional information bit string which includes address information corresponding to a position of said each block on the track,
wherein said positional information bit string is made up of a position code and an identification code, said position code including said address information, said identification code being used to identify the start or the end of said position code, wherein said positional information bit string is divided into a plurality of portions each stored in a different sector of the block, said each portion forming a predetermined part of servo data stored in said different sector, and wherein said method comprises:
as said magnetic disk medium rotates, sequentially reading the value of each bit of said predetermined portion of said servo data in each sector and generating a cyclic positional information bit string, said predetermined portion of said servo data constituting said positional information bit string;
detecting said identification code from said cyclic positional information bit string;
detecting said position code from said cyclic positional information bit string based on a position of said identification code;
extracting said address information from said position code; and
detecting said rotational position based on said address information at the read timing of said position code;

wherein said identification code includes a string of M bits each having a first bit value and further includes a bit having a second bit value which immediately precedes or succeeds said string (where M denotes an integer equal to or larger than 2);

wherein said position code includes a plurality of strings each having a length less than M bits and further includes bits each having said second bit value, said plurality of strings being separated from one another by one of said bits having said second bit value, said plurality of strings collectively forming an address bit string corresponding to said address information;

wherein said address bit string is a binary block number for sequentially numbering each block on a track; and wherein when the proportion of said address bit string in said positional information bit string stored in each block is maximized, the number of blocks on each track is set based on the largest block number that can be expressed by said address bit string.

10. The method as claimed in claim 9, wherein:
said portions of said positional information bit string each consist of one bit;
each block includes 12 sectors; and
said value M is 3 or 4.

11. The method as claimed in claim 10, wherein:
said identification code includes a string of M bits each having a value of 0 and further includes a bit having a value of 1 which immediately follows said string;
said position code immediately follows said identification code; and
said position code includes strings each having a length of (M−1) bits and further includes bits each having a value of 1, said strings being separated from one another by one of said bits having a value of 1, said strings collectively forming said address bit string.

12. The method as claimed in claim 9, wherein said portions of said positional information bit string each consist of one bit.

* * * * *